(12) United States Patent
Walls et al.

(10) Patent No.: US 8,105,522 B2
(45) Date of Patent: Jan. 31, 2012

(54) COMPRESSION MOLD AND MOLDING PROCESS

(75) Inventors: Alex Lee Walls, Laurinburg, NC (US); David Keith Gill, Pinehurst, NC (US)

(73) Assignee: Eaton Corporation, Cleveland, OH (US)

( * ) Notice: Subject to any disclaimer, the term of this patent is extended or adjusted under 35 U.S.C. 154(b) by 24 days.

(21) Appl. No.: 12/290,339

(22) Filed: Oct. 29, 2008

(65) Prior Publication Data

US 2010/0102479 A1    Apr. 29, 2010

(51) Int. Cl.
    *B29C 63/00*    (2006.01)
(52) U.S. Cl. ........ 264/255; 264/241; 264/279; 264/240; 264/271.1; 264/278
(58) Field of Classification Search ........... 264/241.279, 264/240, 271.1, 278, 248, 250, 275, 325, 264/245
    See application file for complete search history.

(56) References Cited

U.S. PATENT DOCUMENTS

| | | | |
|---|---|---|---|
| 1,210,182 A | 12/1916 | Lynch | |
| 1,813,797 A | 7/1931 | Vincent | 264/74 |
| 1,831,255 A | 11/1931 | Menzies | |
| 2,358,259 A | 9/1944 | Siedschlag et al. | 264/247 |
| 2,379,793 A | 7/1945 | Eenigenburg | 264/275 |
| 2,992,828 A | 6/1956 | Stewart | 273/80 |
| 3,606,327 A | 9/1971 | Gordon | 273/81 A |
| 4,674,746 A | 6/1987 | Benoit | 273/81 |
| 4,936,586 A | 6/1990 | Van Raemdonck | 273/73 |
| 5,145,171 A | 9/1992 | Head et al. | 473/300 |
| 5,261,665 A * | 11/1993 | Downey | 473/303 |
| 5,322,290 A | 6/1994 | Minami | 473/201 |
| 5,330,193 A | 7/1994 | Ijiri | 273/193 |
| 5,362,046 A | 11/1994 | Sims | 273/73 |
| 5,465,967 A | 11/1995 | Boeckenhaupt | 273/162 |
| 5,540,625 A | 7/1996 | Koch et al. | 473/318 |
| 5,735,752 A | 4/1998 | Antonious | 473/317 |
| 5,766,088 A | 6/1998 | Severtsen | 473/297 |
| 5,842,933 A | 12/1998 | Lewis | 473/300 |
| 5,851,632 A | 12/1998 | Chen et al. | 428/156 |
| 5,855,525 A | 1/1999 | Turner | 473/300 |
| 6,354,958 B1 | 3/2002 | Meyer | 473/297 |
| 6,506,128 B1 | 1/2003 | Bloom, Jr. | 473/292 |
| 6,626,768 B2 | 9/2003 | Roelke | 473/296 |

(Continued)

FOREIGN PATENT DOCUMENTS

CN    1332022 A    1/2002

(Continued)

OTHER PUBLICATIONS

U.S. Appl. No. 11/655,462, filed Jan. 19, 2007.

(Continued)

*Primary Examiner* — Christina Johnson
*Assistant Examiner* — Xue Liu
(74) *Attorney, Agent, or Firm* — Daniel S. Kalka

(57) ABSTRACT

An improved compression molding process uses a separation plate 26 disposed between the upper and lower sections 22, 24 of a compression mold 20 for forming a grip with a distinct separation of multiple elastomeric materials. An optional compound retention plate 25 mounted on at least one of the mold sections forms a distinct color separation in the resulting grip. The optional compound retention plate 25 provides at least one groove formed in the split line of the grip that may be filled in with paint for a distinct overall two color appearance.

8 Claims, 7 Drawing Sheets

U.S. PATENT DOCUMENTS

| | | | |
|---|---|---|---|
| 6,656,054 B2 | 12/2003 | Ulrich | 473/201 |
| D502,750 S | 3/2005 | Chen | D21/756 |
| RE38,983 E | 2/2006 | Antonious | 473/317 |
| 7,008,582 B2 | 3/2006 | Chen | 264/132 |
| 7,048,644 B2 | 5/2006 | Wang | 473/300 |
| 7,097,797 B2 | 8/2006 | Chen | 264/132 |
| D530,762 S | 10/2006 | Chen | D21/756 |
| D536,048 S | 1/2007 | Chen | D21/756 |
| 7,160,202 B2 | 1/2007 | Chen | 473/300 |
| 7,264,759 B2 | 9/2007 | Lamkin | 264/248 |
| 7,404,770 B2 | 7/2008 | Huang | 473/300 |
| 2002/0066976 A1* | 6/2002 | Cloutier et al. | 264/248 |
| 2002/0173371 A1 | 11/2002 | Lamkin et al. | |
| 2003/0062654 A1 | 4/2003 | Lamkin | |
| 2003/0157990 A1 | 8/2003 | Bloom, Jr. | |
| 2005/0276874 A1* | 12/2005 | Menaldo et al. | 425/129.1 |
| 2007/0032309 A1 | 2/2007 | Chang | |
| 2007/0072696 A1 | 3/2007 | Chen | |
| 2007/0270237 A1* | 11/2007 | Tavares et al. | 473/349 |

FOREIGN PATENT DOCUMENTS

| | | |
|---|---|---|
| EP | 0 227 347 B1 | 7/1987 |
| GB | 2 315 418 A | 4/1998 |
| WO | WO 03-066173 A1 | 8/2003 |

OTHER PUBLICATIONS

U.S. Appl. No. 11/724,062, filed Mar. 14, 2007.
U.S. Appl. No. 11/619,739, filed Jan. 4, 2007.
U.S. Appl. No. 11/607,707, filed Dec. 1, 2006.
U.S. Appl. No. 11/449,108, filed Jun. 8, 2006.
U.S. Appl. No. 11/619,744, filed Jan. 4, 2007.
European Search Report.

* cited by examiner

COMPRESSION MOLD AND MOLDING PROCESS

FIELD

The present disclosure relates in general to an improved compression mold and molding process for making a hand grip or a sports grip, and more particularly to an improved compression molding process for forming a grip with a distinct color arrangement and material compositions.

BACKGROUND

There are many forms of grips available on the market today for a wide variety of implements. These implements can range from shock imparting implements, like hammer handles or other hand tools, to sports implements like tennis, squash, or racquetball rackets, or golf clubs, or simply handle grips for motorcycles, bicycles, or the like. While the present disclosure is particularly suited for manufacturing a golf club grip and is described with specific reference thereto, it should be immediately apparent that the present disclosure is not intended to be limited only to golf grips and extends to any type of grip.

Originally, golf club grips consisted primarily of a leather wrap around a handle. Later, molded rubber grips became available and are still in wide use today. A recent variation on the molded rubber grip is the concept of using a rubber sleeve or underlisting on the handle with leather or synthetic leather wrap spirally wrapped around the underlisting for a softer hand feel. Grips are made today with various methods such as injection molding or compression molding processes from a wide variety of materials.

There still exists a need for an improved process that allows for the manufacture of a grip with a distinct separation of colors and/or material composition with the ability to control material flow at a separation or parting line, also referred to herein as the grip split line. The resulting grip will offer an aesthetically pleasing appearance and superior grip feel.

BRIEF SUMMARY OF THE DISCLOSURE

The present disclosure relates to an improved compression mold and method for making a grip, which includes the steps of: providing a compression mold with an upper section with a mold cavity, a lower section with a mold cavity, and a compound retention plate. A separation plate is also provided to separate the mold cavities of the upper and lower sections during the molding process. A first elastomeric material is placed in the mold cavity of the lower section, and the separation plate is positioned thereon. A second elastomeric material which may be different in color, composition, or both is placed on a selected location of the separation plate for filling the mold cavity in the upper section. The compression mold is then closed and heated to distribute the elastomeric materials within their respective mold cavities. The separation plate is removed and a core bar positioned within the compression mold between the mold cavities of the upper and lower sections. The elastomeric materials contained within the mold cavities are compression molded at a temperature sufficient to finish forming and curing the grip.

The method of the present disclosure allows for different colored materials to be used to form a grip with a visible distinction in color separation at the parting line or grip split line after the molding process.

The method of the present disclosure allows for the use of dual compounds for providing a grip with differences in grip feel in a simple, straightforward process.

The improved compression mold of the present disclosure simplifies the methods of the present disclosure.

The various features of novelty which characterize the present disclosure are pointed out with particularity in the claims annexed to and forming a part of this disclosure. For a better understanding and its operating advantages attained with its use, reference is made to the accompanying drawings, and descriptive matter.

DETAILED DESCRIPTION

Figure 1:
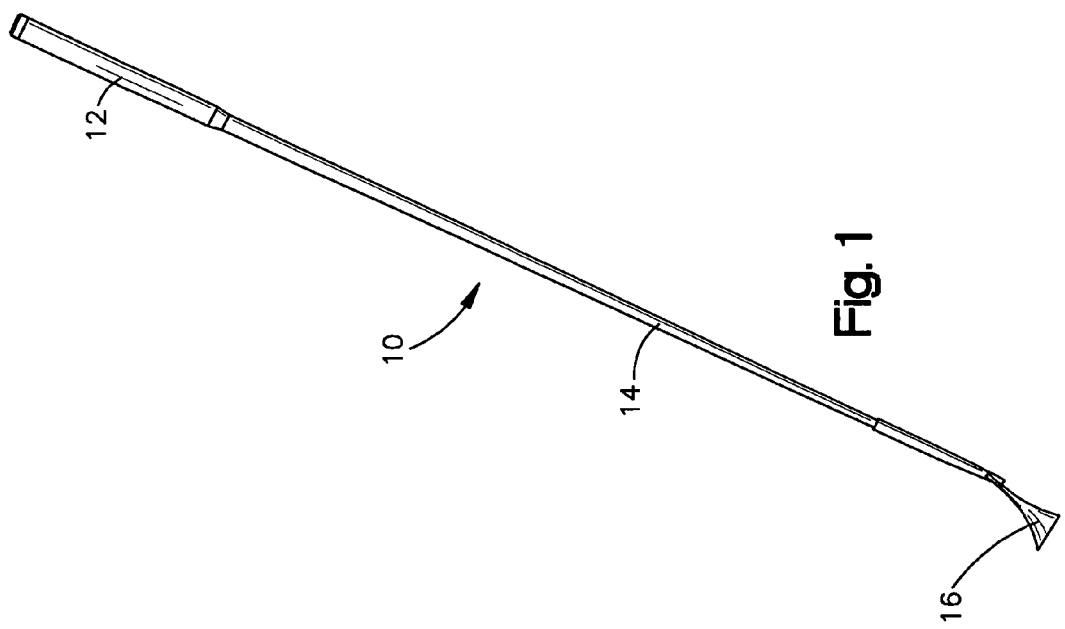
FIG. 1 is a perspective view of a golf club.

Referring to the figures, which are not intended to limit the present disclosure and where like numerals designate like or similar features throughout the several views, and first in particular to FIG. 1, there is shown a golf club generally designated 10. The golf club generally designated 10 includes a grip 12, a shaft or handle 14, and a club head 16. The golf club grip 12 is a slip-on style grip. The term "slip-on" as employed herein is intended to refer to a grip that is designed to slide onto a handle or shaft 14 and be secured thereon by some means. The grip slides on to the shaft 14 and may be secured by an adhesive, tape, mechanically attached, or any other suitable means. Slip-on grips are commercially available in many different shapes, designs, and materials for a wide variety of applications. These types of grips are made usually of elastomeric materials like natural or synthetic rubber compounds, synthetic plastics, thermoplastic materials, and may contain fibers, cords, or other material embedded therein to enhance gripping or grip feel. Even though the present disclosure is particularly suited for making a golf club grip, and specifically described for that purpose, the present disclosure is not intended and should not be construed as being limited only to golf grips. The compression mold and method of the present disclosure may be used for making a slip-on grip for many different applications where a grip is slid on to a handle or shaft.

Figure 2:
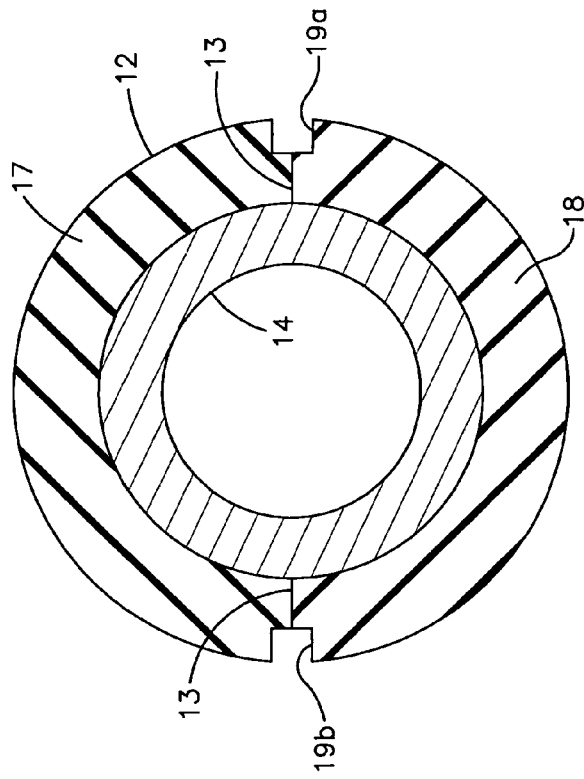
FIG. 2 is a cross-sectional view of the golf club grip.

FIG. 2 depicts in sectional view a golf club grip 12 made with the method of the present disclosure and the compression mold of the present disclosure. One side 17 of grip 12 is one selected color and material composition and the other side 18 of grip 12 is another selected color and may be a different material composition. The material compositions are comprised of completely all or primarily all elastomeric materials. The term "elastomeric material" as employed herein is meant to include without limitation natural, synthetic rubber materials or combinations of both, synthetic plastics, thermoplastic materials, combinations thereof, or other synthetic resilient materials. One embodiment of the grip 12 contains grooves 19a and 19b at the grip split or parting line 13 on each side of the grip 12. The manner in which these grooves are formed will be explained herein in much greater detail. These grooves may be filled in with paint after the grip 12 has been finished to fill in the grooves.

Figure 4:
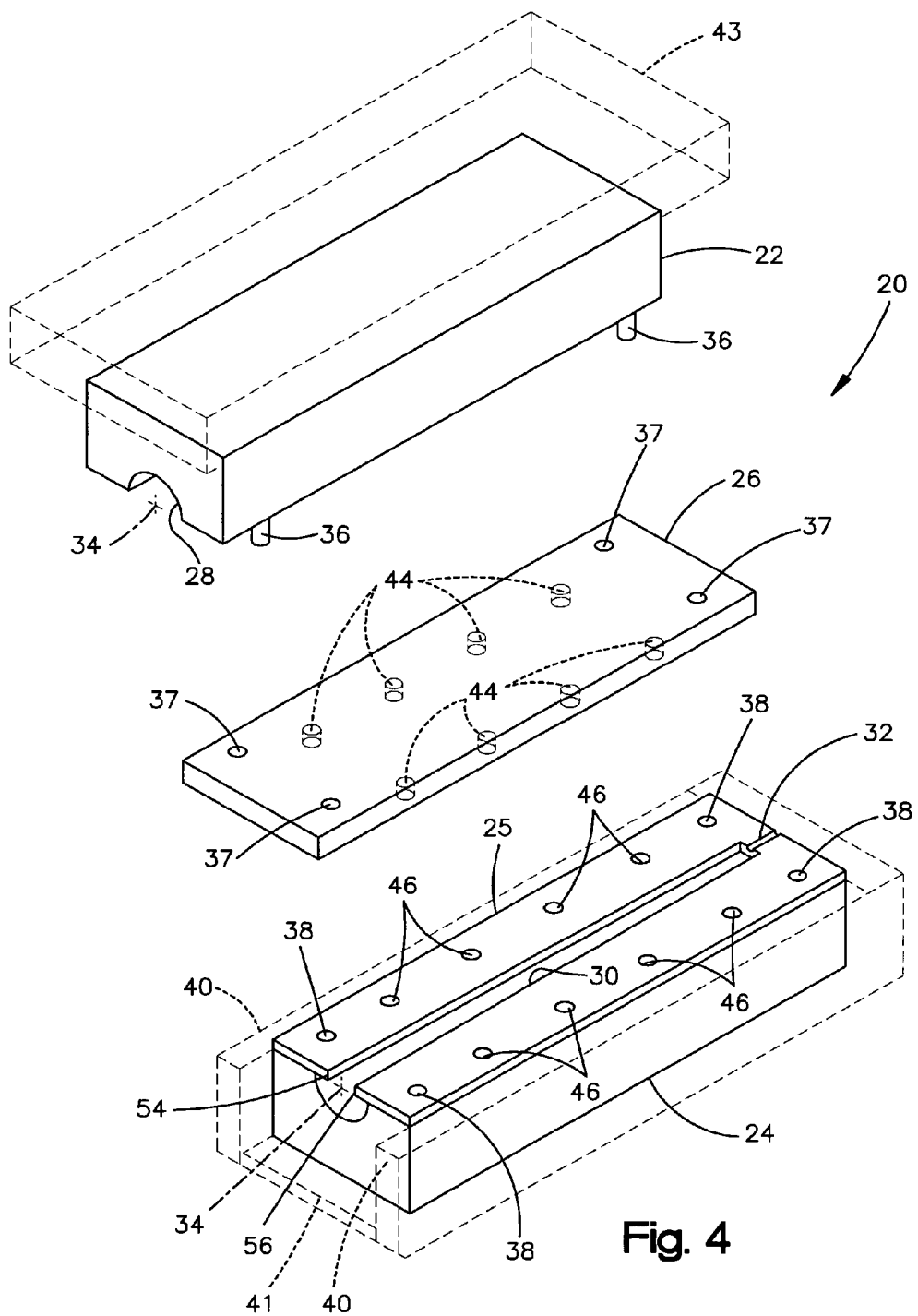
FIG. 4 is an exploded view of the upper and lower sections of the compression mold with the separation plate disposed between the sections.

Referring now to FIG. 4, there is depicted in an exploded form one embodiment of a compression mold 20 for manufacturing golf club grips in accordance with the method of the present disclosure. Compression mold 20 includes an upper mold section 22, a lower mold section 24, a compound retention plate 25 mounted to the lower mold section 24, a separation plate 26, and a core bar or mandrel 27 (shown in FIG. 10). While FIG. 4 shows the compound retention plate 25 mounted to the lower mold section 24, it optionally may be mounted to the upper mold section 22 instead. The upper and lower mold sections 22, 24 each contain a mold cavity 28, 30 respectively. Another embodiment of the compression mold 20' suitable for use with the method of the present disclosure is nearly identical to the compression mold 20, except that the embodiment of compression mold 20' does not mount the compound retention plate 25 on either the upper or lower mold sections 22, 24.

Figure 6:
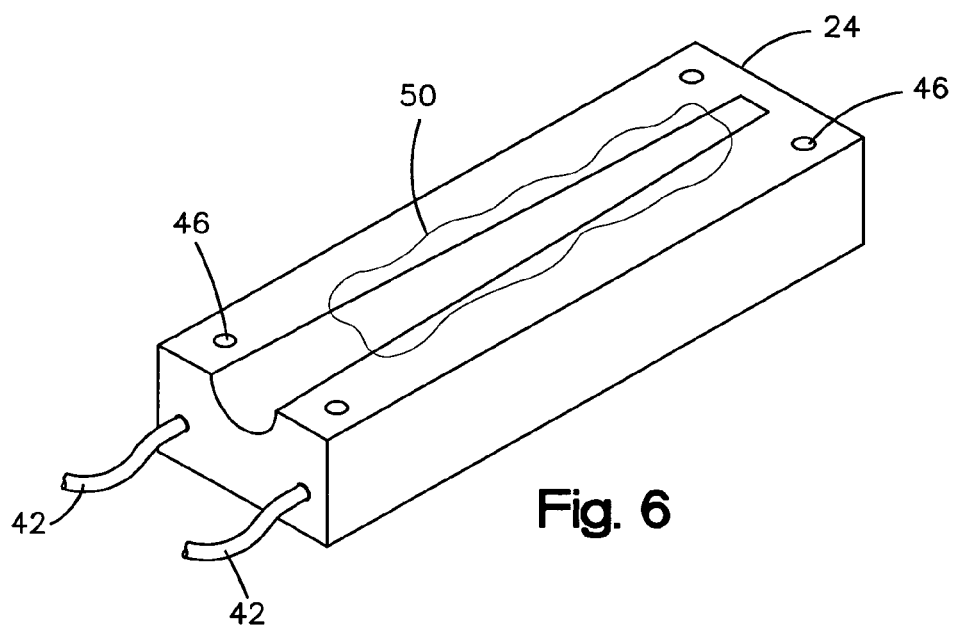
FIG. 6 is a perspective view of another embodiment of the lower section 24 of the compression mold.
Figure 7:
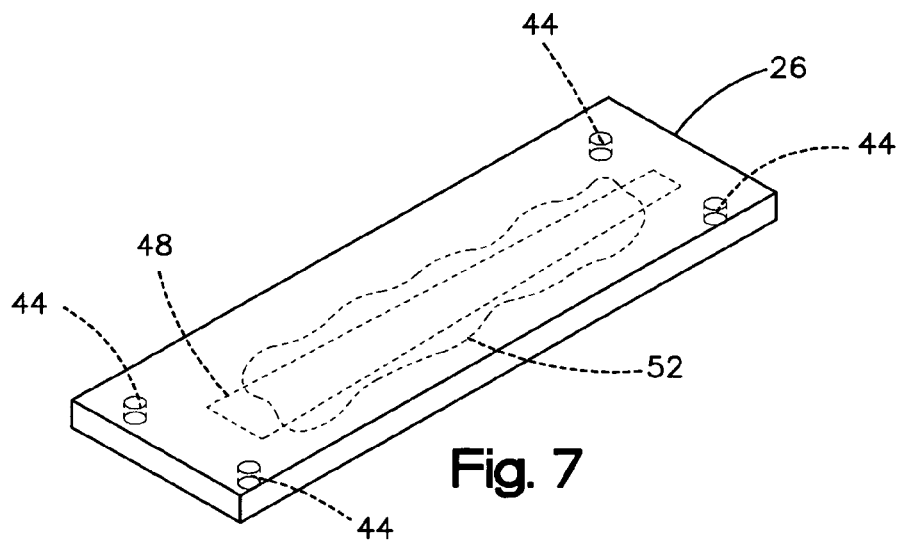
FIG. 7 is a perspective view of the separation plate 26.

FIG. 6 depicts the lower section 24' of the compression mold 20' without the compound retention plate 25.

Figure 5:
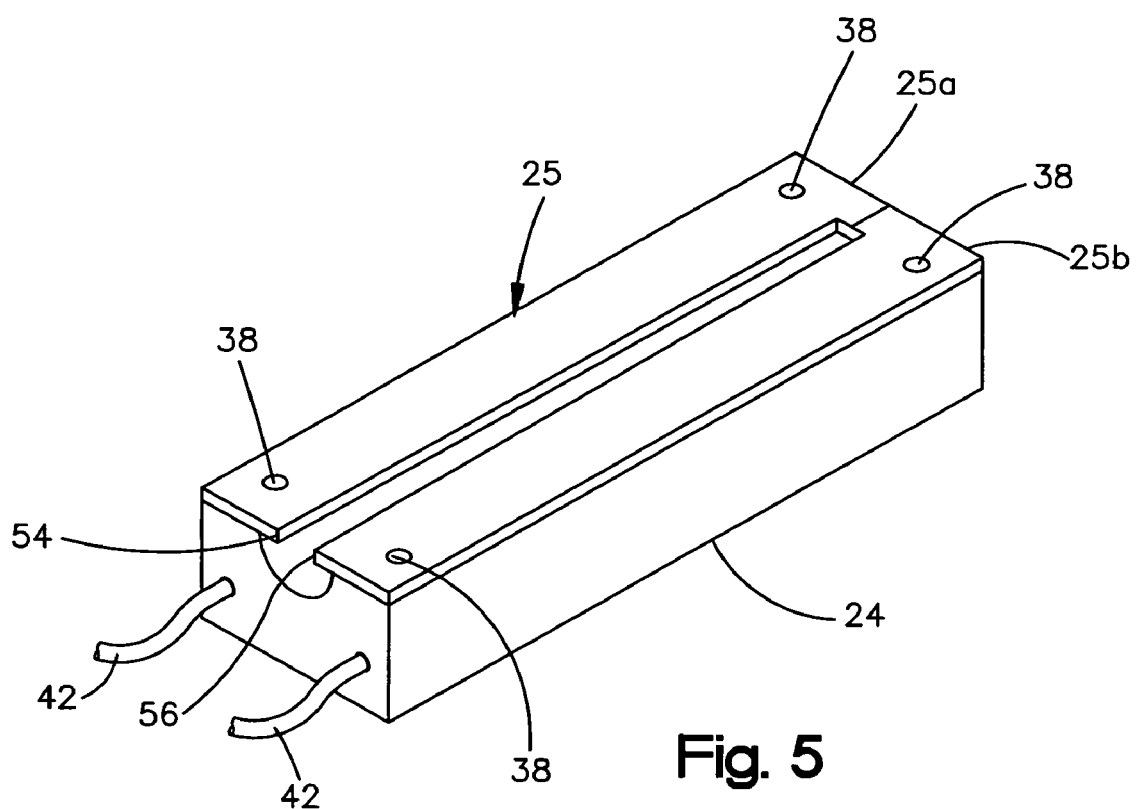
FIG. 5 is a perspective view of one embodiment of a lower section 24' of the compression mold.

Returning to FIG. 4, the upper and lower sections 22, 24 include mold cavities 28, 30 respectively in confronting surfaces of the upper and lower sections 22, 24 as seen in FIG. 4 in a form that will shape the grip in a desired form upon compression and completion of the molding process. Each of the mold cavities 28, 30 are closed at one end 32 and each have an open end 34 situated axially at a desired distance opposite the closed end 32. The desired distance is the axial length of the grip to be formed which will vary upon application. For illustrative purposes only, the axial length of a typical golf grip is approximately 27 millimeters. The mold cavities 28, 30 may include a pattern or design formed by machining grooves or lines into the cavity walls, or providing raised portions in the cavity walls for forming a corresponding pattern or design in the outer surface of the formed grip for gripping and/or aesthetic purposes. The upper and lower sections 22, 24 in one embodiment include a system for aligning the sections so that the mold cavities 28, 30 are in alignment. The system for alignment may vary with other embodiments such as markings on the sections for alignment purposes, alignment guide posts 36 with mating openings 37 in the separation plate 26 and openings 38 in the lower mold section 24 as seen in FIG. 4, or optional alignment bars 40 shown in dashed line attached to an optional table 41, also shown in dashed line, holding the lower section in place while an optional press 43, shown in dashed line, holds the upper section 22 in proper position and is constructed to apply the compressive force during the molding process. Combinations of these optional alignment systems may be employed in a wide variety of embodiments. Upper and lower sections 22, 24 are heated either by resistive heating of the molds as depicted by the electrical wires 42 in the upper and lower sections 22, 24 as seen in FIGS. 4 and 5. Other suitable methods for heating the compression mold 20 may be employed for heating, vulcanizing and curing the elastomeric materials in the mold into the final form of the grip.

Figure 3:
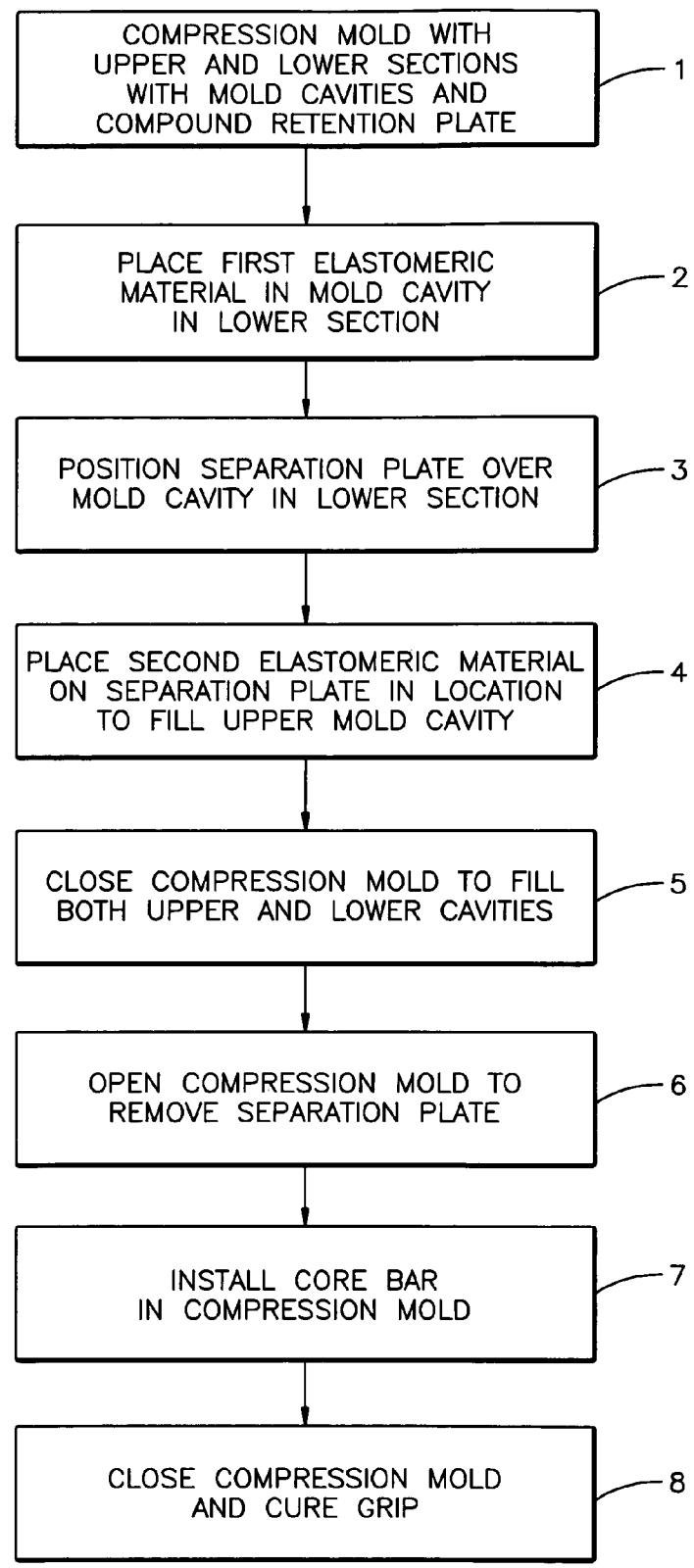
FIG. 3 is a flow chart setting forth the steps of the method according to the present disclosure.

Turning next to FIG. 3, the method of the present disclosure is set forth in a flow diagram. The first step, step 1, in the method of the present disclosure comprises a heated, separable compression mold 20, 20' with a suitable embodiment to those previously described with respect to FIGS. 4 and 5.

In the second step, step 2 of the method according to the present disclosure, a first elastomeric material 50 shown in dashed line of a desired color, composition, and form is placed into the lower mold cavity 30 in the lower mold section 24. The first elastomeric material 50 can be any suitable form for filling the mold cavity 30, for example, liquid, solid, semi-solid, powder, pellet form, or pre-cut sheet conforming to the shape of the mold cavity. The elastomeric material is added in a manner that is intended to overfill the mold cavity 30 during compression and heating. The extra material is trimmed off.

Next, the separation plate 26 is placed over the mold cavity 30 in the lower section 24 in step 3. Optional locating pins 44 shown in dashed line are constructed to be received within openings 46 in the lower mold section 24 to align the separation plate 26 in the compression mold 20.

Step 4 places a second elastomeric material 52, which may be of the same composition or formulation as the first elastomeric material 50, or different composition, and a different color, or alternatively a different composition or formulation with the same color, on a top surface of the separation plate 26 in an optionally marked location 48 which may be used as guidance for the operator. The second elastomeric material 52 like the first elastomeric material 50 can be in the form of a pre-cut sheet conforming somewhat to the shape of the upper mold cavity 28, or added as in liquid, powder or pellet form so as to overfill the mold cavity 28 during compression and heating.

Figure 8:
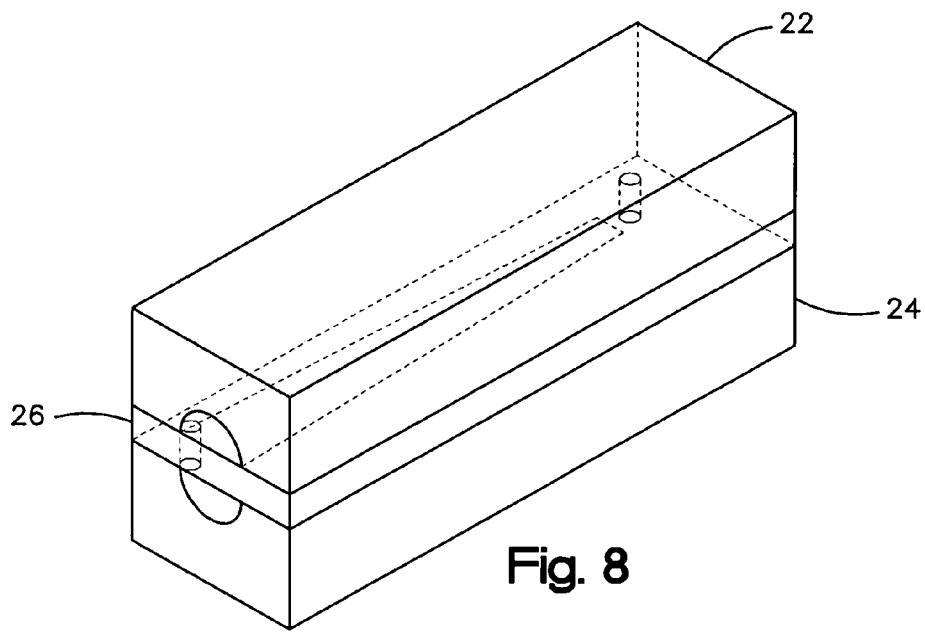
FIG. 8 is perspective view showing the separation plate 26 disposed between the upper and lower sections 22, 24.
Figure 9:
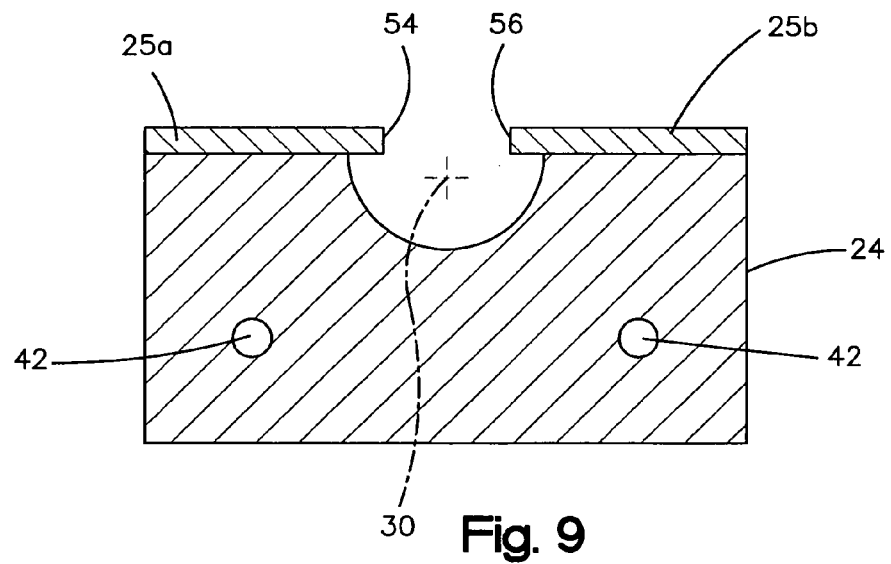
FIG. 9 is a frontal view of the lower section 24'.

The upper and lower sections 22, 24 with the separation plate 26 disposed therebetween of the compression mold are closed compressively in a fairly sealed manner as seen in FIG. 8 and heated for a short period of time in step 5 to allow the elastomeric materials to fill the upper and lower mold cavities 28, 30 respectively and remain in those cavities in a substantially sheet type form. For the illustrative golf grip, this was for a period of approximately thirty seconds at a temperature in the range of approximately 150° C. to approximately 200° C.

The compression mold 20 is then opened carefully to allow the separation plate 26 to be removed from the compression mold 20 and to allow the separation plate to separate from the elastomeric materials 50, 52 still disposed in their respective mold cavities 28, 30 in step 6.

Figure 10:
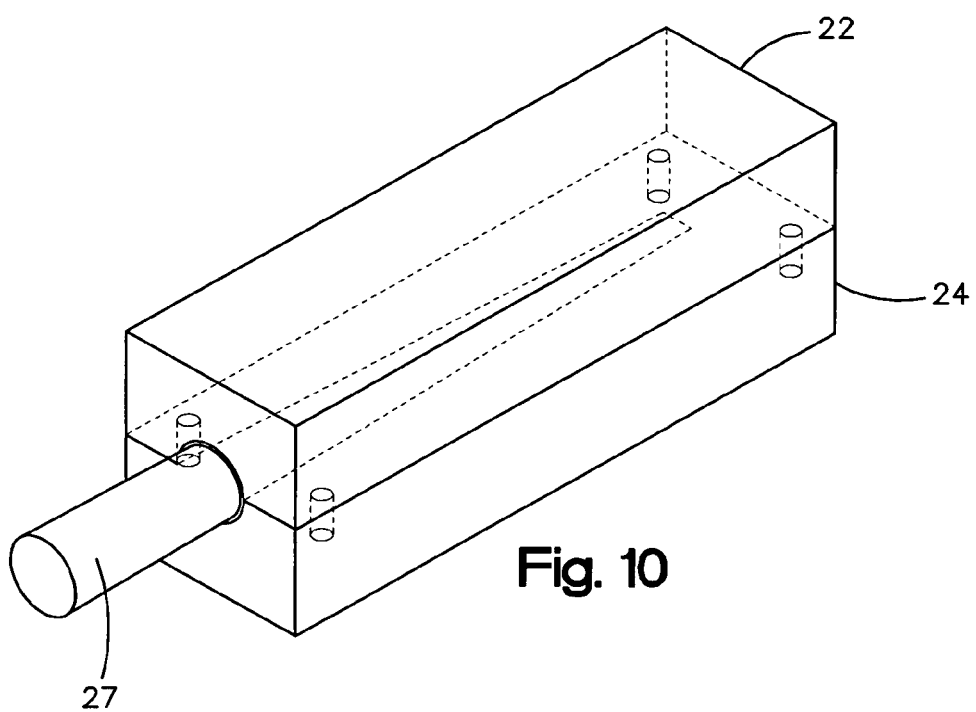
FIG. 10 is a perspective view showing the core bar 27 within the upper and lower sections 22, 24.

A core bar or mandrel 27 having an elongated generally cylindrical shape fairly conforming to the mold cavities 28, 30 is inserted into the compression mold 20 through the open ends 34 of the upper and lower sections 22, 24 as seen in FIG. 10.

Heat is applied to the compression mold 20. The compressive force of compression mold 20 is sufficient to vulcanize the elastomeric materials into an integrated formed golf grip of a structure as seen in sectional view in FIG. 2 with at least two distinct and different colors 17, 18 when two different colored elastomeric materials are used. Any excess material or flashing resulting from the molding process can be trimmed in a known manner.

Grooves 19a and 19b are formed in the grip 12 by a leading edge 54, 56 that extends from each side of the compound retention plate 25 into the mold cavities 28, 30. Compound retention plate 25 is mounted on the lower mold section 24 in a manner that places at least one leading edge 54, 56 in an overhanging relationship into the mold cavity 28, 30 in a shape corresponding to the shape of the desired grip. Grooves 19a and 19b can have a width of approximately 3 millimeters or less, and a depth of approximately 1 millimeter or less.

Other embodiments of the method of the present disclosure provide for the groove 19 present only on one side of the grip 12. In this embodiment only one leading edge 54 is provided on the compound retention plate 25. Still another embodiment of the present disclosure is to construct the compound retention plate 25 in two pieces, 25*a* and 25*b*, as seen in FIG. 5.

While specific embodiments of the invention have been shown and described in detail to illustrate the application of the principles of the invention, it will be understood that the invention may be embodied otherwise without departing from such principles.

We claim:

1. A method for making a grip having sides with distinct colors, comprising the steps of:
    providing a compression mold with an upper section, a lower section, and a separation plate separating the upper and lower sections, said upper and lower sections of said compression mold each having a mold cavity with a form for shaping the grip;
    mounting a compound retention plate on one of the sections of the compression mold, said compound retention plate having at least one leading edge extending into the mold cavity for forming at least one groove in a grip split line;
    placing a first elastomeric material with a first color in the mold cavity in the lower section of the compression mold;
    positioning the separation plate over the mold cavity in the lower section of the compression mold;
    placing a second elastomeric material with a different color on a top surface of the separation plate for overfilling the mold cavity in the upper section;
    closing the compression mold and heating the compression mold to overfill the first elastomeric material into the lower mold cavity and to overfill the second elastomeric material into the upper mold cavity in a substantially sheet type form;
    removing the separation plate from the compression mold and allowing the separation plate to separate from the first and second elastomeric materials still being disposed in their respective mold cavities;
    inserting a core bar between the upper and lower mold cavities of the compression mold;
    applying additional heat and compression molding the elastomeric materials in the upper and lower mold cavities to vulcanize the elastomeric materials; and
    forming a grip having two sides with different colors and a distinct separation of the different colored first and second elastomeric materials at the grip spat line.

2. A method as recited in claim 1, wherein the first and second elastomeric materials have a similar composition.

3. A method as recited in claim 1, wherein the first and second elastomeric materials have different compositions.

4. A method as recited in claim 1, further comprising the step of providing a location guide on the separation plate for facilitating placement of the second elastomeric material thereon.

5. A method as recited in claim 1, further comprising the steps of providing locating pins in the separation plate with corresponding apertures in the compression mold for facilitating positing the separation plate in the compression mold.

6. A method as recited in claim 2, wherein the elastomeric materials comprise rubber materials.

7. A method as recited in claim 3, wherein the elastomeric materials comprise thermoplastic materials.

8. A method as recited in claim 1, wherein the elastomeric materials are rubber.

* * * * *